US006368382B1

(12) United States Patent
Chiou

(10) Patent No.: US 6,368,382 B1
(45) Date of Patent: Apr. 9, 2002

(54) EPOXYSILICONE COATED MEMBRANES

(75) Inventor: Jeffrey J. Chiou, Irvine, CA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/626,977

(22) Filed: Jul. 27, 2000

(51) Int. Cl.$^7$ ............................................. B01D 53/22
(52) U.S. Cl. ...................... 95/49; 95/51; 95/52; 96/13; 96/14; 55/524; 55/DIG. 5
(58) Field of Search ................ 95/45, 49, 51, 95/52; 96/4, 12, 13, 14; 55/524, DIG. 5

(56) References Cited

U.S. PATENT DOCUMENTS

| | | | | |
|---|---|---|---|---|
| 3,133,132 A | | 5/1964 | Loeb et al. ............... | 264/49 |
| 4,130,403 A | | 12/1978 | Cooley et al. ............ | 55/16 |
| 4,230,463 A | | 10/1980 | Henis et al. ............. | 55/16 |
| 4,243,701 A | * | 1/1981 | Riley et al. ............. | 96/13 X |
| 4,393,113 A | * | 7/1983 | Sugie et al. ............. | 96/12 |
| 4,527,999 A | * | 7/1985 | Lee ...................... | 96/13 X |
| 4,551,156 A | * | 11/1985 | Li ........................ | 95/51 X |
| 4,602,922 A | * | 7/1986 | Cabasso et al. ......... | 96/13 |
| 4,696,686 A | * | 9/1987 | Usami et al. ............ | 96/13 |
| 4,781,733 A | * | 11/1988 | Babcock et al. ......... | 95/49 |
| 4,877,528 A | | 10/1989 | Friesen et al. .......... | 210/500.29 |
| 4,883,593 A | * | 11/1989 | Friesen et al. .......... | 96/13 X |
| 4,976,897 A | * | 12/1990 | Callahan et al. ........ | 96/13 X |
| 5,286,280 A | * | 2/1994 | Chiou ................... | 96/13 X |
| 5,356,461 A | * | 10/1994 | Sluma et al. ............ | 96/13 X |
| 5,409,524 A | * | 4/1995 | Jensvold et al. ........ | 96/13 X |
| 5,702,503 A | * | 12/1997 | Tse Tang ............... | 96/13 X |

FOREIGN PATENT DOCUMENTS

| | | | | |
|---|---|---|---|---|
| JP | 62-183837 | * | 8/1987 | ............... 96/14 |
| JP | 63-277211 | * | 11/1988 | ............... 96/14 |
| JP | 01-080422 | * | 3/1989 | ............... 96/14 |
| JP | 01-080423 | * | 3/1989 | ............... 96/14 |
| JP | 01-080424 | * | 3/1989 | ............... 96/14 |

OTHER PUBLICATIONS

Article "Thin–Film Composite Membrane for Single–Stage Seawater Desalination by Reverse Osmosis" by R. L. Riley et al., Applied Polymer Symposium No.22, pp. 255–267 (1973).

* cited by examiner

Primary Examiner—Robert H. Spitzer
(74) Attorney, Agent, or Firm—John G. Tolomei; Frank S. Molinaro; Mark Goldberg

(57) ABSTRACT

The invention relates to a method of making an epoxysilicone coated membrane by coating a porous asymmetric membrane layer with a UV-curable controlled release epoxysilicone coating. A mixture of the epoxysilicone resin and an onium photocatalyst are applied to the porous asymmetric membrane layer in a dilute non-polar solution and cured by UV or electron beam radiation to produce a dry epoxysilicone coated membrane. The porous asymmetric membrane layer is comprised of an asymmetric cellulosic membrane or an asymmetric polymer membrane with a low selectivity. The epoxysilicone coating was found to provide the asymmetric membrane layer with improved selectivity which extends to separation temperatures below 70° C. and provides stable flux rates. Membranes produced in this manner are useful for the separation of gases such as carbon dioxide from natural gas.

27 Claims, No Drawings

EPOXYSILICONE COATED MEMBRANES

FIELD OF THE INVENTION

This invention relates to semipermeable asymmetric membranes useful in selective separations of gases and liquids

BACKGROUND OF THE INVENTION

Gas permeation may be defined as a physical phenomenon in which certain components selectively pass through a substance such as a membrane. Basically, a gas permeation process involves introducing a gas into one side of a module which is separated into two compartments by a permeable membrane. The gas stream flows along the surface of the membrane and the more permeable components of the gas pass through the membrane barrier at a higher rate than those components of lower permeability. After contacting the membrane, the depleted feed gas residue stream is removed from contact with the membrane via a suitable outlet on the feed compartment side of the vessel. The other side of the membrane, the permeate side, is provided with a suitable outlet through which the permeated gaseous components can be removed from contact with the membrane. The purpose of a membrane in a gas permeation process is to act as a selective barrier, that is, to permit passage of some but not all components of a gaseous feed stream. Generally, in gaseous membrane separation processes, the separation is due to molecular interaction between gaseous components of the feed stream and the membrane. Because different components interact differently with the membrane, the transmission rates (permeation fluxes) are different for each component. Hence, separation of different components can be effected. U.S. Pat. No. 4,130,403, which is hereby incorporated by reference, discloses the use of cellulosic membranes in processes for the separation and removal of acid components from hydrocarbon gases.

Semipermeable asymmetric cellulosic "skinned" separation membranes formed by phase inversion and solvent exchange methods are known (see U.S. Pat. No. 3,133,132 which is hereby incorporated by reference). Such membranes are characterized by a thin, dense, selectively semipermeable surface "skin" and a less dense void-containing, non-selective support region, with pore sizes ranging from large in the support region to very small proximate to the "skin". Such membranes have a serious shortcoming in that, in operation, fluxes decrease substantially over time. This decrease has been attributed to a collapse of some of the pores near the skinned surface of the membrane, resulting in an undue densification of the surface skin. One attempt at overcoming this problem has been the development of thin film composite or "TFC" membranes, comprising a thin selective skin deposited on a resilient porous support. See, for example, "Thin-Film Composite Membrane for Single-Stage Seawater Desalination by Reverse Osmosis" by R. L. Riley et al., *Applied Polymer Symposium* No. 22, pages 255–267 (1973). While TFC membranes are less susceptible to flux decline than phase inversion-type membranes, fabrication of TFC membranes that are free from leaks is difficult, and fabrication requires multiple steps and so is generally more complex and costly.

Asymmetric membranes may be formed from other polymers such as polysulfone, polyethersulfone, polyamide, polyimide, polyetherimlide, cellulose nitrate, polyurethane, polycarbonate, polystyrene, etc. are also susceptible to flux decline and fabrication of asymmetric membranes from such other polymeric materials which are free of leaks is similar in difficulty and expense to producing TFC membranes.

One approach to overcoming the problem of leaks in asymmetric membranes has been the fabrication of an asymmetric gas separation membrane comprising a relatively porous and substantial void-containing selective "parent" membrane such as polysulfone or cellulose acetate that would have permselectivity were it not porous, wherein the parent membrane is coated with a material such as a polysiloxane or a silicone rubber in occluding contact with the porous parent membrane, the coating filling surface pores and other imperfections comprising voids (see U.S. Pat. No. 4,230,463). However, the coatings of such coated membranes, especially where the coatings are polysiloxane, are subject to degradation by solvents inherently present in the gaseous feed streams of common acid gas separations, and otherwise tend to leach out, thus permitting either flux decline or low selectivity that is more characteristic of the uncoated parent membrane. For example, U.S. Pat. No. 4,877,528 attempts to overcome the flux decline characteristic of coated cellulosic membranes by grafting or bonding an asymmetric cellulosic semipermeable membrane and a polysiloxane. U.S. Pat. No. 4,877,528 discloses that the grafting of the polysiloxane can be accomplished by either a polycondensation reaction whereby a polysiloxane containing one or more hydroxyl-reactive functional groups is reacted with the hydroxyl groups of the cellulose polymer of the cellulosic membrane, or by a polyaddition reaction whereby a polysiloxane containing one or more vinyl alkynyl, or free radical-forming groups is reacted with the cellulosic substrate. In both cases, the result is the bonding of the grafting of the polysiloxane to the cellulosic membrane by non-crosslinked, covalent bonds. Examples presented indicate that the grafting did reduce some of the loss of the siloxane content and loss in performance during operation, but such grafted membrane still exhibited more than a 50 percent loss in siloxane content and a 50 percent loss in performance.

These coatings are usually applied to substrates as dispersions in a solvent system in order to reduce the viscosity sufficiently so that the coating composition is easily coatable. Such prior art post-treatments may provide gas separation membranes which exhibit improved selectivity; however, unless the solvent is highly inert toward the membrane polymer, the treating solution may also cause or induce change or damage to the morphology of the membrane, which may cause loss of trans-membrane flux. The presence of the solvent, either water or some suitable low boiling organic solvent, necessitates evaporation. Thus, heat is typically applied to substrates coated with silicones for the removal of solvent and to thermally induced curing. This heating step may result in damage to the underlying substrate.

Fluorosilicones are generally well suited to use as conformal coatings because of their resistance to solvent swelling and degradation. Photo-curable silicones that are intended for low modulus cured coatings typically consist of linear silicone molecules that have photo-reactive centers widely separated by non-functional polysiloxane segments so that a low cross-link density results when the silicone is cured. Because they consist almost entirely of polydimethylsiloxane segments, such photo-curable silicone polymers are incompatible with onium ionic photo-catalysts. This incompatibility results in an inefficient and/or slow photo-cure. The fluorosilicone polymers suffer from these same drawbacks.

Therefore, a membrane post-treatment is needed which improves selectivity but does not change or damage the membrane, or cause the membrane to lose performance with time. In addition, gas separation membranes desirably have a high permeability to gases. This means that the effective portion of the membrane should be as thin as possible. Making the membrane as thin as possible necessarily leads to the membrane containing imperfections or defects. These defects pass gases indiscriminately thus reducing the selectivity of the membrane. In the past, these membrane defects have been sealed or reduced to improve gas separation membrane performance.

Other methods of improving membrane performance have relied on the chemical treatment of the membrane substrate with a swelling agent which are believed to improve the selectivity of a membrane.

What is needed, therefore, is an asymmetric membrane that can be inexpensively made by conventional single casting techniques, yet has a high selectivity and a stable flux rate which essentially do not decline in use. These needs and others are met by the present invention, which is summarized and described in detail below.

SUMMARY OF THE INVENTION

The present invention is a process for preparing a fluid separation membrane comprising an asymmetric membrane substrate which is directly coated with a radiation curable silicone coating which provides improved stable performance over a wider range of temperature than previously known materials. The asymmetric membrane substrate includes cellulosic membranes and membranes formed from other polymers such as polysulfone, polyethersulfone, polyamide, polyimide, polyetherimide, cellulose nitrate, polyurethane, polycarbonate, polystyrene, etc. More specifically, the membranes of the present invention exhibit essentially no loss in selectivity or loss in flux rates. By the term "stable flux rate", it is meant that the flux declines less than about 30 percent, and more particularly the flux rate declines less than 20 percent over a typical operating period. Furthermore, unlike silicone coated membranes of the prior art, the fluid separation membranes of the present invention are coated with a UV curable epoxysilicone coating which is not chemically bonded to the membrane substrate. Epoxysilicone coated porous cellulosic membranes produced according to the present invention exhibit essentially no loss in selectivity and essentially no loss in siloxane content even following hexane extraction.

In one embodiment, the present invention is a method for the production of a fluid separation membrane comprising directly coating a porous asymmetric membrane, such as cellulose acetate, with a dilute solution of the epoxysilicone resin and an onium ionic photo-catalyst dissolved in a non-polar, organic solvent to uniformly disperse the epoxysilicone resin over the asymmetric membrane, evaporating the non-polar organic solvent, and crosslinking the epoxysilicone resin by subjecting the epoxysilicone resin to ultraviolet or electron beam radiation. According to the invention, the method comprises casting a porous asymmetric membrane layer; drying the porous asymmetric membrane layer to form a dry porous asymmetric membrane; uniformly coating the dry porous asymmetric membrane with a coating comprising a dilute epoxysilicone solution to form a coated membrane; and irradiating and drying the coated membrane to produce the epoxysilicone coated membrane.

In a further embodiment, the present invention is a process for the separation of a permeable component from a feed stream comprising the permeable component and natural gas. The process comprises passing the feed stream at effective conditions to a membrane separation zone containing a porous asymmetric membrane layer coated with a uniform UV-curable epoxysilicone coating and recovering a permeate stream enriched in the permeable component relative to the feed stream, and a non-permeate stream depleted in the permeable component relative to the feed stream.

DETAILED DESCRIPTION OF THE INVENTION

Acidic components, hydrogen sulfide, and carbon dioxide may be removed from a gaseous light hydrocarbon or a mixture of light hydrocarbons such as natural gas by the use of a suitable gas permeable membrane. In addition, a gas permeable membrane may be used to produce a relatively pure carbon dioxide gas which may be utilized in enhanced oil recovery processes such as the miscible flooding of carbonate reservoirs. The light hydrocarbons from which $CO_2$ and/or $H_2S$ can be removed by the method of the instant invention include lower aliphatic hydrocarbons such as methane, ethane, propane, butanes, pentanes, hexanes and to a lesser extent, aliphatic hydrocarbons having more than about eight carbon atoms and mixtures thereof. Some feed streams may contain small amounts of aromatic components such as benzene and toluene. Natural gas streams which can be treated in accordance with the instant invention typically contain at least about 2 percent $CO_2$. Natural gas streams can comprise from about 1 ppm-vol to about 98 volume percent $H_2S$. Some natural gases may contain up to about 98 percent $CO_2$. Gases containing high concentrations of $CO_2$ cannot be economically processed by conventional processes to produce a substantially $CO_2$-rich stream such as one containing about 95 percent $CO_2$. Thus, the use of membrane technology is particularly attractive when the $CO_2$ concentration ranges between about 2 and about 70 volume percent in natural gas or similar light hydrocarbon stream.

Generally, organic or organic polymers mixed with inorganics are used to prepare the porous separation membrane. Typical polymers suitable for the porous separation membrane according to the invention can be substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines;

etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Selection of the porous separation membrane for the present multi-component membrane for gas separations may be made on the basis of the heat resistance, solvent resistance, and mechanical strength of the porous separation membrane, as well as other factors dictated by the operating conditions for selective permeation, as long as the coating and porous separation membrane have the prerequisite relative separation factors in accordance with the invention for at least one pair of gases. The porous separation membrane is preferably at least partially self-supporting, and in some instances may be essentially self-supporting. The porous separation membrane may provide essentially all of the structural support for the membrane, or the multi-component membrane may include a structural support member which can provide little, if any, resistance to the passage of gases.

When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psig). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressures greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about –50° to about 80° C. More preferably, the effective operating temperature of the membranes of the present invention will range from about –20° to about 70° C., and most preferably, the effective operating temperature of the membranes of the present invention will be less than about 70° C. Some membranes such as plastics and resins exhibit better permeability characteristics at higher temperatures; however, in the preferred embodiment, a cellulose acetate membrane is utilized. It was discovered that the permeability characteristics of the membrane of the present invention showed a surprising improvement over conventionally produced cellulosic membranes at operating temperatures below about 50° C. As operating temperature was reduced below about 50° to about –10° C., the membranes of the present invention exhibited an almost 20 percent improvement in selectivity over conventional cellulosic membranes. As a practical matter, the operating temperature may be maintained at ambient temperature. The upper limiting temperature is thought to be that temperature at which the membrane deteriorates and no longer serves as a useful gas separator.

The selectivity of a membrane (also called separation factor) in separating two gas species A and B from each other is defined as the ratio of their gas permeances in that membrane. The selectivity (A/B) can be obtained by measuring the gas permeance of each gas in pure gas state or in mixed gas state. The selectivity is a measure of how well the membrane can separate the gases while the permeance is a measure of how fast the membrane can let the gases pass through. In most applications, the membrane is made to maximize both permeance and selectivity (see U.S. Pat. No. 5,702,503, column 15, lines 21–67, hereby incorporated by reference).

Radiation curable protective coatings are useful for a variety of applications, such as topcoats over printed matter and similar uses. Such radiation curable compositions are typically highly functional reactive substances which cure to yield highly cross-linked, glossy, and hard coatings. Silicone coatings of this type frequently contain so-called Q functional siloxane groups ($SiO_{4/2}$) in their structure. Such Q containing silicones are generally referred to as resins to distinguish them from silicone fluids which are usually linear, consisting largely of repeating D groups ($R_2 SiO_{2/2}$, where R usually is methyl). Highly reactive organofunctional silicone Q resins are typically very viscous semi-solids or friable solids at room temperature and thus not readily coatable because they are not liquid. Indeed, when functionalized with polar organic moieties that are reradiation cross-linkable, even linear silicone fluids can become highly viscous and therefore difficult to coat using standard coating techniques.

Epoxy-functional silicones such as taught in U.S. Pat. No. 5,650,453 and U.S. Pat. No. 4,279,717, which are hereby incorporated by reference, when combined with certain compatible iodonium cationic photo-catalysts, are known to be useful for producing UV curable epoxysilicone release coatings. Epoxysilicone release coatings allow high speed processing with minimal energy expenditures. If the viscosity of the coating composition exceeds 1,000 centistokes (cstk) at room temperature, the absence of solvent in the composition renders them difficult to apply, particularly if a thin coating on the order of 1 $gm/m^2$ is desired. The viscosity constraint imposed by processing equipment thus imposes constraints on the molecular weight of the silicone composition and on linearly functionalized photo-curable silicone fluids such as epoxysilicones. Additional constraints are provided by the need for photo-catalyst miscibility or solubility, the need for a rapid photo-cure response, and good release performance. While a high epoxy content in an epoxysilicone, as epoxy functional groups on a linear silicone molecule, tend to promote onium photo-catalyst compatibility with the silicone and a rapid photo-cure, a low epoxy content is required for premium or low force release characteristics.

Controlled release is an additional aspect of photo-curable epoxysilicone release performance. Compositions containing both epoxy functional and phenol functional silicones as taught in U.S. Pat. No. 5,138,012, and Q resins containing epoxysilicones as taught in U.S. Pat. Nos. 5,360,833 and 5,369,205 provide a so-called controlled release. Controlled release refers to a controllable and predictable release force that may be varied from very easy to very tight depending on the desired application.

The present invention employs an ultra-violet or electron beam curable silicone coating composition comprising:

(a) an epoxy functional silicone selected from the group consisting of $$MD_x D^E_y Q_z T_u D^{Rf}_j D^A_k D^P_l (D'(CH(R)CH_2O))_m)_n D^B_p M,$$

$$M^E D_x D^E_y Q_z T_u D^{Rf}_j D^A_k D^P_l (D'(CH(R)CH_2O))_m)_n D^B_p M^E,$$

$$M^E D_x D^E_y Q_z T_u D^{Rf}_j D^A_k D^P_l (D'(CH(R)CH_2O))_m)_n D^B_p M,$$

and mixtures thereof;
where
$M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=(CH_3)_3SiO_{2/2}$,
$D^E=(C_6H_9O(CH_2)_2)(CH_3)SiO_{2/2}$,
$D^R_f=(CF_3CH_2CH_2)(CH_3)SiO_{2/2}$,
$D^A=((HO)(C_2H_3)C_6H_9(CH_2)_2)(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$,
where R is selected from the group consisting of hydrogen, methyl, and ethyl, and
where j, k, l, m, n, p, x, y, z, and u are positive integers and k, l, n, p, u and z may be zero and wherein said epoxy functional silicone has a viscosity ranging from about 100 to about 100,000 centistokes at 25° C.; and (b) an effective amount of a bis(dodecylphenyl)iodonium salt photocatalyst, the photocatalyst being selected from the salts of the group of acids consisting of hexafluoroantimonic acid, hexafluoroarsenic acid, hexafluorophosphoric acid, tetrafluoroboric acid, tetra(perfluorophenyl)boric acid and mixtures thereof. The subscripts on the various components of the epoxyfunctional silicones may be varied at will within the constraints already listed, i.e. either non-zero or optionally zero such that the viscosity is within the defined range.

It is preferred that the epoxysilicone resin be combined with an effective amount of the onium photocatalyst, wherein the effective amount of the onium photocatalyst in an epoxysilicone UV-curable mixture is a ratio ranging from about 100:1 to 100:10 by weight of the epoxysilicone resin to the onium photocatalyst, and more particularly that the epoxysilicone resin be combined with the onium photocatalyst in a ratio ranging from about 100:1 to 100:4 by weight of the epoxysilicone resin to the photocatalyst. It is preferred that the epoxysilicone UV-curable mixture be diluted in a non-polar organic solvent such as hexane or heptane and mixtures thereof in a concentration of from about 0.1 to about 10 weight percent provided an effective coating. The epoxysilicone/catalyst mixture is applied to the surface of the base cellulose membrane in a dilute solution of hexanes, heptanes and mixtures thereof in a concentration of the epoxysilicone/catalyst mixture ranging from about 0.1 to about 10 weight percent. The hexanes and heptanes can be any combination of normal and iso-paraffins and may be present in any ratio of hexanes to heptanes ranging from 1:10 to 10:1.

Epoxysilicones which are UV curable are commercially available from various sources, for example, GE Silicones of Waterford, N.Y. makes and sells a number of UV-photocurable epoxysilicones under the denominations UV9315, UV9430, and UV9400. An example of the onium photo-catalyst compatible with such epoxysilicones is made and sold by GE Silicones of Waterford, N.Y. under the denomination UV9380C. A preferred formulation for achieving a cellulosic membrane coating of the controlled release epoxysilicone mixture would include about 100 parts UV-photocurable epoxysilicone and 1–4 parts onium photocatalyst.

The asymmetric membrane will be further described in relation to an asymmetric cellulosic membrane, although it is believed that the techniques for coating the asymmetric membrane with the UV-curable epoxysilicone coating and the benefits of the present invention will also apply to asymmetric membranes produced from other polymers such as polysulfone, polyethersulfone, polyamide, polyimide, polyetherimide, cellulose nitrate, polyurethane, polycarbonate, polystyrene, etc. The asymmetric cellulosic membrane is a thin porous membrane having a skin thickness of less than about 10,000 angstroms. Preferably, the asymmetric cellulosic membrane has a skin thickness between about 200 and about 1000 angstroms, and more preferably, the asymmetric cellulosic membrane has a skin thickness between about 300 and about 500 angstroms. The permeability constant of a particular gas through a particular membrane may be determined experimentally by contacting the gas with a membrane of known area and thickness, recording the differential pressure across the membrane and measuring the rate of permeation, or diffusion, of the gas through the membrane. After the permeability constant for several components has been determined, the relative separation of the two gases can be determined. Generally, in order to separate one gaseous component from another, the ratio of the permeability constants of the more permeable component to the other component should be at least five, wherein the selectivity ($\alpha$) is well-known to those skilled in the art and is herein defined as the relative permeance of an acid gas component such as $CO_2$ to the permeance of a hydrocarbon component such as methane ($CH_4$), where the permeance of a component is the gas flow of a mixture of $CO_2$ and $CH_4$, divided by the area of the membrane surface times the differential partial pressures of the component between the feed pressure and the permeate pressure.

The term "asymmetric cellulosic membrane" in the context of the instant invention includes cellulose ester membranes such as cellulose acetate, cellulose diacetate, cellulose triacetate, cellulose propionate, cellulose butyrate, cellulose cyanoethylate, cellulose methacrylate and mixtures thereof may be utilized. These membranes may be flat film or hollow fiber. A particularly preferred membrane comprises cellulose acetate. The base cellulosic membrane layer can be made to any degree of initial porosity as characterized by its initial selectivity, which may range from 0.1 to about 15. The base cellulosic membrane layer of the present invention is porous and is characterized as having an initial selectivity of less than about 5, and more preferably having a selectivity between about 0.5 and about 3, and most preferably having a selectivity between about 1 and about 2. It was found that in order to make a stable coated membrane, the concentration of the epoxysilicone/catalyst content in the dilute solvent was dependent upon the initial porosity of the base membrane layer. When the selectivity of the base cellulosic membrane was greater than about 5, the concentration of the epoxysilicone/catalyst in the solvent solution ranged from about 0.1 to about 5 weight percent, and more preferably when the selectivity of the base cellulosic membrane was greater than about 5, the concentration of the epoxysilicone/catalyst in the solvent solution ranged from about 0.1 to about 2 weight percent. When the basic cellulosic membrane layer was very porous, that is having a selectivity less than about 5, it was discovered that the concentration of the epoxysilicone resin plus the catalyst in the dilute solvent solution was critical to the production of an acceptable membrane for gas separation applications. When the selectivity of the base membrane was less than about 5, a concentration of epoxysilicone resin/catalyst in the dilute solvent less than about 1 weight percent proved to be insufficient to block the defects in the base cellulosic membrane. When the selectivity of the base membrane was less than about 5, a concentration of the epoxysilicone resin/catalyst in the dilute solvent greater than about 10 weight percent provided a coating which was too thick and which actually reduced gas permeance through the membrane. Therefore, when the porous asymmetric layer comprises a selectivity less than 5, the dilute epoxysilicone solution should comprise a ratio of epoxysilicone mixture to solvent ranging from about 2 to about 6 parts per 100 parts weight. When the porous asymmetric layer comprises a selectivity greater than 5, the dilute epoxysilicone solution should comprise a ratio of epoxysilicone mixture to solvent ranging from about 0.5 to about 3 parts per 100 parts weight.

The improvement of the epoxysilicone coated asymmetric cellulosic membranes of the present invention over conventional asymmetric cellulose membranes in maintaining selectivity is dramatic and exhibits essentially no loss of silicone and exhibits a highly stable flux rate. By the term "flux rate", it is meant the rate at which a gaseous composite passes through the membrane. The membranes of the present invention exhibited essentially no loss of selectivity following extraction with a non-polar solvent, hexane. It is believed that following extraction with other non-polar solvents such as pentanes, hexanes, cyclohexanes, heptanes, and the like, the membranes of the present invention will exhibit essentially no loss in selectivity. The invention is further illustrated by the following examples which are illustrative of specific modes of practicing the invention and are not intended as limiting the scope of the invention defined in the claims.

EXAMPLES

Example I

A relatively porous cellulose acetate membrane having a $CO_2/CH_4$ selectivity of about 1.6 was prepared in a conventional manner from a casting dope comprising, by approximate weight percentages, 8 percent cellulose triacetate; 8 percent cellulose diacetate, 47 percent dioxane, 20 percent acetone, 12 percent methanol, 2.4 percent lactic acid, 3.1 percent n-decane. A film was cast on a nylon web then gelled by immersion in a 2° C. water bath for about 10 minutes, and then annealed in a hot water bath at 80° to 90° C. for about 15 minutes. The resulting wet membrane was dried in air at a drying temperature between about 60° and 70° C. to remove water. The dry porous asymmetric cellulosic membrane was then coated with a dilute epoxysilicone solution containing about 4 weight percent epoxysilicone (4 parts epoxysilicone portion to 96 parts silicone solvent). The silicone solvent comprised a 1:3 ratio of hexane to heptane; i.e., 24 parts hexane and 72 parts heptane. The epoxysilicone portion consisted of a mixture of 100 parts of epoxysilicone resin UV9315, and 3 parts by weight of the photocatalyst UV9380C, obtained from GE Silicones of Waterford, N.Y. The dilute epoxysilicone solution was placed in a trough and applied to the continuous web of cellulosic membrane by contacting the web with a stainless steel roller which picked up the dilute epoxysilicone solution and applied it uniformly to one side of the web. The epoxysilicone coating was exposed to a UV source for a period of about 2 to 4 minutes at ambient temperature to cure the coating while the silicone solvent evaporated to produce the epoxysilicone coated membrane of the present invention.

Example II

A 3 inch (76 mm) diameter circle of the porous cellulose membrane web, or substrate, and a 3-inch diameter circle of the epoxysilicone coated membrane of Example I were evaluated for gas transport properties using a gas stream containing 10 volume percent $CO_2$/90 volume percent $CH_4$ at a feed pressure of about 6.89 MPa (1015 psia). Table 1 shows a comparison of the $CO_2$ permeance rate and the selectivity ($\alpha$) of uncoated base and the epoxysilicone coated membrane of the present invention.

TABLE 1

| Gas Transport Properties | | |
| --- | --- | --- |
| Material | $CO_2$ Permeance | Selectivity |
| Porous Cellulose Base | 31.1 | 1.6 |
| Epoxysilicone Coated | 12.3 | 15.0 |

Example III

The gas transport properties of the epoxysilicone-coated membrane of the present invention were compared to conventionally prepared cellulose acetate membranes over a range of typical operating temperatures and pressures. A comparison of the gas transport properties of the epoxysilicone coated membrane of the present invention relative to gas transport properties of conventionally produced cellulose acetate membranes is shown in Table 2. Table 2 shows the relative ratio of performance of the membrane of the present invention as a ratio of the $CO_2$ rate and the ratio of the selectivity to the performance of the cellulose acetate membrane of the prior art at pressures ranging from about 4.24 MPa (615 psia) to about 7.69 MPa (1115 psia) for a gas stream containing 10 mole percent $CO_2$ and 90 mole percent methane. The membranes of the present invention exhibited a higher $CO_2$ permeance rate and a greater selectivity at essentially all conditions.

TABLE 2

| Comparison of Gas Transport Properties with Conventional CA Membranes | | |
| --- | --- | --- |
| | Performance Ratio: Invention/Conventional | |
| Temp (° C.) | $CO_2$ rate | Selectivity |
| 10% $CO_2$ / 4.24 MPa | | |
| 50 | 1.30 | 1.01 |
| 30 | 1.36 | 1.03 |
| 10 | 1.48 | 1.04 |
| 0 | 1.51 | 1.11 |
| −10 | 1.68 | 1.19 |
| 10% $CO_2$ / 5.62 MPa | | |
| 50 | 1.51 | 0.96 |
| 30 | 1.65 | 1.00 |
| 10 | 1.78 | 1.09 |
| 0 | 1.89 | 1.17 |
| −10 | 1.98 | 1.26 |
| 10% $CO_2$ / 7.69 MPa | | |
| 50 | 1.41 | 0.96 |
| 30 | 1.51 | 1.05 |

TABLE 2-continued

Comparison of Gas Transport Properties
with Conventional CA Membranes

| Temp (° C.) | Performance Ratio: Invention/Conventional | |
|---|---|---|
| | $CO_2$ rate | Selectivity |
| 10 | 1.49 | 1.20 |
| 0 | 1.58 | 1.28 |
| −10 | 1.67 | 1.24 |

Example IV

The stability of the epoxysilicone-coated membranes of the present invention was determined by exposing the epoxysilicone-coated membrane to extraction in a bath of hexane for about a 19-hour period. Six 3-inch (76-mm) circles of the epoxysilicone membrane of the present invention were soaked in a glass jar containing 120 grams of hexane at ambient conditions and then dried in air. Gas transport properties were determined before and after the hexane extraction. Table 3 shows that there was essentially no change in the gas transport properties following extraction with hexane.

TABLE 3

Gas Transport Properties After Hexane Extraction
Performance Ratio: Post-Extraction/Pre-Extraction

| Weight (grams) | $CO_2$ rate | Selectivity |
|---|---|---|
| 2.45 | 0.96 | 0.99 |

Example V

Silicone-grafted membranes disclosed in U.S. Pat. No. 4,877,528 comprising cellulosic semipermeable membranes which are the covalently bonded reaction product of an asymmetric cellulosic membrane and a polysiloxane chemically bonded thereto show a significant loss of selectivity and flux stability compared to the epoxysilicone coated membranes of the present invention. In Example 3 of U.S. Pat. No. 4,877,528 in column 8, lines 7–17, it is stated that the silicone-grafted membranes exhibited a 50 percent loss of $CO_2/CH_4$ selectivity and a 55 percent loss of siloxane content following extraction with hexane, a non-polar solvent. Less than a 2 percent loss in selectivity was observed in Example IV for the epoxysilicone-coated membrane of the present invention. Table 4 shows the loss in selectivity of the prior art grafted membranes compared to the epoxysilicone coated membrane of the present invention. The membrane of the present invention exhibited essentially no loss of selectivity, or less than about 2 percent, in a $CO_2$/methane separation following hexane extraction.

TABLE 4

Comparison to Grafted Membranes

| | % Loss in $CO_2$ / $CH_4$ selectivity due to hexane extraction |
|---|---|
| US-A-4,877,528 (Example 3) | 50% |
| Present invention | 2% |

I claim:

1. A process for the separation of a permeable component from a feed stream comprising the permeable component and natural gas, said process comprising passing the feed stream at effective conditions to a membrane separation zone containing a porous asymmetric membrane layer coated with a uniform UV-curable epoxysilicone coating and recovering a permeate stream enriched in the permeable component relative to the feed stream, and a non-permeate stream depleted in the permeable component relative to the feed stream.

2. The process of claim 1 wherein the porous asymmetric membrane layer comprises a selectivity less than about 5.

3. The process of claim 1 wherein the effective conditions include a separation temperature below about 70° C.

4. The process of claim 1 wherein the porous asymmetric membrane layer comprises a membrane selected from the group consisting of cellulose acetate, cellulose diacetate, cellulose triacetate, cellulose propionate, cellulose butyrate cellulose cyanoethylate, cellulose methacrylate and mixtures thereof.

5. The process of claim 1 wherein the UV-curable epoxysilicone coating comprises a uniform layer of an epoxysilicone mixture formed from the irradiation of an epoxysilicone resin and onium photocatalyst comprising a ratio of 1–4 parts onium photocatalyst to 100 parts epoxysilicone resin.

6. The process of claim 1 wherein the permeable component is selected from the group consisting of carbon dioxide, hydrogen sulfide, water, and mixtures thereof.

7. A membrane comprising a porous asymmetric membrane layer having a uniform epoxysilicone coating wherein the uniform epoxysilicone coating comprises the reaction product of an epoxysilicone resin and an onium photocatalyst.

8. The membrane of claim 7 wherein the porous asymmetric membrane layer comprises a cellulosic membrane selected from the group consisting of cellulose acetate, cellulose diacetate, cellulose triacetate, cellulose propionate, cellulose butyrate, cellulose cyanoethylate, cellulose methacrylate and mixtures thereof.

9. The membrane of claim 7 wherein the porous asymmetric membrane layer comprises a polymer selected from the group consisting of polysulfone, polyethersulfone, polyamide, polyimide, polyetherimide, cellulose nitrate, polyurethane, polycarbonate, polystyrene, and mixture thereof.

10. The membrane of claim 7 wherein the porous asymmetric membrane layer comprises a skin thickness less than about 1000 angstroms.

11. The membrane of claim 7 wherein the porous asymmetric membrane layer comprises a selectivity between about 0.5 and about 15.

12. The membrane of claim 7 wherein the membrane exhibits essentially no loss of selectivity on extraction with a non-polar solvent selected from the group consisting of pentanes, hexanes, heptanes, and mixtures thereof.

13. A method for preparing an epoxysilicone coated asymmetric membrane, said method comprising:
   (a) casting a porous asymmetric membrane layer;
   (b) drying the porous asymmetric membrane layer to form a dry porous asymmetric membrane;
   (c) uniformly coating the dry porous asymmetric membrane with a coating comprising a dilute epoxysilicone solution to form a coated membrane; and
   (d) irradiating and drying the coated membrane to produce the epoxysilicone coated membrane.

14. The method of claim 13 wherein the dilute epoxysilicone solution comprises an epoxysilicone resin and an onium photocatalyst in a non-polar organic solvent.

15. The method of claim 13 wherein the porous asymmetric membrane layer comprises a cellulosic membrane selected from the group consisting of cellulose acetate, cellulose diacetate, cellulose triacetate, cellulose propionate, cellulose butyrate, cellulose cyanoethylate, cellulose methacrylate and mixtures thereof.

16. The method of claim 13 wherein the porous asymmetric membrane layer comprises a polymer selected from the group consisting of polysulfone, polyethersulfone, polyamide, polyimide, polyetherimide, cellulose nitrate, polyurethane, polycarbonate, polystyrene, and mixture thereof.

17. The method of claim 13 wherein the porous asymmetric membrane layer comprises a skin thickness less than about 1000 angstroms.

18. The method of claim 13 wherein the porous asymmetric membrane layer comprises a selectivity between about 0.5 and about 15.

19. The method of claim 13 wherein the porous asymmetric membrane layer comprises a selectivity less than about 5.

20. The method of claim 13 wherein the porous asymmetric membrane layer comprises a selectivity between 1 and about 3.

21. The method of claim 13 wherein the irradiation step comprises ultra violet or electron beam radiation.

22. The method of claim 13 wherein the dilute epoxysilicone solution comprises an epoxysilicone resin, an onium catalyst dissolved in a non-polar solvent selected from the group consisting of hexanes, heptanes, and mixtures thereof.

23. The method of claim 22 wherein the dilute epoxysilicone solution comprises an epoxysilicone mixture of epoxysilicone resin and onium photocatalyst comprising a ratio of 1–4 parts onium photocatalyst to 100 parts epoxysilicone resin.

24. The method of claim 23 wherein the dilute epoxysilicone solution comprises a ratio of epoxysilicone mixture to solvent ranging from about 0.5 to about 10 parts per 100 parts weight.

25. The method of claim 23 wherein the porous asymmetric layer comprises a selectivity less than 5 and the dilute epoxysilicone solution comprises a ratio of epoxysilicone mixture to solvent ranging from about 2 to about 6 parts per 100 parts weight.

26. The method of claim 23 wherein the porous asymmetric layer comprises a selectivity greater than 5 and the dilute epoxysilicone solution comprises a ratio of epoxysilicone mixture to solvent ranging from about 0.5 to about 3 parts per 100 parts weight.

27. The product of the method of claim 13.

* * * * *